(12) United States Patent
Anderson

(10) Patent No.: US 7,744,111 B2
(45) Date of Patent: Jun. 29, 2010

(54) LEANABLE TRACKING TRAILER FOR A MOTORCYCLE

(76) Inventor: Fred R Anderson, 221 New Bristol Rd., Crystal Falls, MI (US) 49920

( * ) Notice: Subject to any disclaimer, the term of this patent is extended or adjusted under 35 U.S.C. 154(b) by 472 days.

(21) Appl. No.: 11/502,088

(22) Filed: Aug. 10, 2006

(65) Prior Publication Data

US 2008/0042403 A1 Feb. 21, 2008

(51) Int. Cl.
*B62D 53/02* (2006.01)
(52) U.S. Cl. .................. 280/492; 280/489; 280/202; 280/204; 280/282
(58) Field of Classification Search ............ 280/492, 280/489, 202, 204, 282
See application file for complete search history.

(56) References Cited

U.S. PATENT DOCUMENTS

| 3,521,904 | A | | 7/1970 | Sheffer | |
|---|---|---|---|---|---|
| 3,937,489 | A | * | 2/1976 | Hawes et al. | 280/204 |
| 3,994,507 | A | | 11/1976 | Doll et al. | |
| D272,335 | S | | 1/1984 | Bauer | |
| 4,511,155 | A | * | 4/1985 | Galloway | 280/204 |
| 4,536,001 | A | * | 8/1985 | Wagner | 280/837 |
| 4,548,423 | A | * | 10/1985 | Craven | 280/492 |
| 5,011,170 | A | * | 4/1991 | Forbes et al. | 280/204 |
| 5,171,034 | A | * | 12/1992 | Scott | 280/204 |
| 5,984,342 | A | * | 11/1999 | Ysker | 280/492 |
| 6,042,138 | A | * | 3/2000 | Shreck | 280/492 |
| 6,454,289 | B1 | * | 9/2002 | Mullins | 280/476.1 |
| D523,779 | S | * | 6/2006 | Mattila | D12/101 |
| 7,121,575 | B2 | * | 10/2006 | Finch | 280/489 |

* cited by examiner

*Primary Examiner*—Lesley Morris
*Assistant Examiner*—Marlon A Arce
(74) *Attorney, Agent, or Firm*—Raymond M. Galasso; Galasso & Associates, L.P.

(57) ABSTRACT

A one wheeled trailer is disclosed for use with and for pulling behind a two wheeled vehicle such as a motorcycle or motorbike. The trailer is configured to track behind the motorcycle or motorbike and to lean with the cycle as a unit so as to respond in the same manner as the motorcycle or motorbike. The trailer is supported on a single tire aligned to track behind the motorcycle tires thereby eliminating the sideways torque when the trailer hits a pothole or a curb. The trailer is designed to perform on the road and in turns the same as the motorcycle and does not limit the motorcycle from performing the way it was intended.

6 Claims, 7 Drawing Sheets

LEANABLE TRACKING TRAILER FOR A MOTORCYCLE

FIELD OF THE DISCLOSURE

The disclosures made herein relate generally to wheeled trailers for pulling behind pulled behind a two wheeled vehicle having wheels aligned in tandem and, more particularly, to single wheeled trailers for pulling behind motorcycles or motorbikes and the like, where the trailer is configured to track behind the motorcycle and to lean with the motorcycle as a unit so as to respond in the same manner.

BACKGROUND

Motorcycles are well known and are commonly used by people who appreciate fuel economy and the sense of freedom that come with riding in the open air. Motorcycle trailers are also known, and are typically two wheeled trailers.

Because of their size and open construction, motorcycles have known drawbacks in their ability to transport luggage or other goods. Motorcycle trailers have been developed over time to address the luggage and material transport limitations of motorcycles. Such trailers find use in transporting camping gear, cooking utensils, sleeping bags, tents and the like for use in extended trips and vacations, as well as for hauling everyday items such as groceries or perhaps tools to a job site.

One limitation in known motorcycle trailers is in width of the trailer. In the late 1970's automotive manufacturers were required to increase the width of the wheelbase so reduce the chance of a roll over. If you make a two wheeled motorcycle trailer wide enough to prevent rollover, the trailer will overhang the width of the motorcycle to the extent that on corners and in heavy traffic the trailer tires extend beyond the width of the motorcycle to the point that they hit corners and other objects.

Another limitation of known two wheeled motorcycle trailers is that they are not built to lean into corners. When a motorcycle navigates a turn, the rider leans the motorcycle such that the vertical motorcycle frame remains substantially aligned with the combined force of gravity and the induced centrifugal force of the turn, as failure to do this will cause the bike or motorcycle to fall over to its side due to centrifugal force.

Another limitation of known motorcycle two wheeled trailers is that the trailers wheels are not aligned with the motorcycle wheels, which is to say the trailer wheels do not track directly behind the motorcycle wheels but are instead positioned off to the side from the path of the wheels. Thus, if the wheel on the trailer hits a pothole, curb of other obstacle, the additional drag force is applied to the motorcycle not directly in line with the wheels of the cycle, but instead off to the side of the motorcycle. As the drag force is applied off center to the motorcycle, the force induces a torque to the motorcycle which acts to induce the motorcycle to veer or turn from its directed path. In traffic or at significant speeds or on gravel or slippery pavement this can be unsafe if not fatal in certain circumstances.

The freedom of riding the motorcycle is the ability to travel with ease and agility due to the width, power and stability of the motorcycle. The performance of the motorcycle is diminished by not allowing the motorcycle to lean properly on turning a corner, for instance when pulling a two wheeled trailer which will not lean, or when using a motorcycle sidecar that prevents the motorcycle from leaning. This causes stress and removes the joy of motorcycling.

Therefore, a motorcycle trailer which will lean with the motorcycle allowing the motorcycle and trailer to respond as a unit, a trailer having a tire that will track behind the motorcycle tires thereby eliminating the sideways torque when the trailer hits debris, a pothole or a curb, a trailer than can be built to be light in weight eliminating the feeling of under power while riding the motorcycle, a trailer that is can be kept the same width as the widest part of the motorcycle thereby eliminating the problem of maneuvering through traffic with trailer hanging out past the side of the motorcycle, a trailer that will perform on the road and in turns the same as the motorcycle and will not limit the motorcycle from performing the way it was intended, such a motorcycle trailer would be useful and novel.

SUMMARY OF THE DISCLOSURE

Accordingly, embodiments of the inventive disclosures made herein comprise a one wheeled leanable tracking trailer for pulling behind a motorcycle or motorbike.

In embodiments of the inventive disclosures made herein, the trailer configured to be pulled behind a two wheeled and to track and lean with the vehicle comprises a trailer frame formed of preferably metallic tubular components, a wheel positioned under a center portion of the frame, a means of rotably mounting the wheel to the frame such that the wheel provides rolling support for the trailer traveling over ground or the road. A trailer tongue is secured to a front portion of the trailer frame. An articulating coupling member couples the trailer tongue to the motorcycle hitch. The articulating coupling is configured to be disengageable such as to allow the trailer to be coupled to the hitch of the motorcycle or motorbike for use and later decoupled when no longer needed. The articulating coupling is a joint which couples the trailer tongue to the hitch and transfer tension and compressive forces while permitting the trailer tongue to swivel side to side and up and down relative to the hitch. The tire is preferable an air filled rubber tire.

In a second embodiment the trailer configured to be pulled behind a two wheeled vehicle of the first embodiment has the articulating coupling member comprising an elongated flexible link member having a sheath thereover to resist torsional twisting of the flexible link member, thereby keeping the trailer vertically aligned similarly to the motorcycle or motorbike.

In one or more embodiments of the inventive disclosures made herein, the flexible link member has two opposing link ends with a length of flexible metallic cable spanning between and secured to the opposing link ends. The sheath over the flexible coupling is a molded rubber wrap providing torsional resistance to twisting of the flexible link.

In one or more embodiments of the inventive disclosures made herein, the articulating coupling member comprises of a rotating link type ball hitch, allowing the ball type hitch to swivel sideways direction with a horizontal pin mount to allow free up and down movement.

In one or more embodiments of the inventive disclosures made herein the means of rotably mounting the wheel to the trailer frame includes a suspension arm having one end pivotally mounted to the trailer frame and the opposing end of the suspension arm having the wheel rotably mounted thereto. A shock absorbing strut for resisting compression in the direction of its length is provided. The strut has opposing first and second attachment ends, the first strut end pivotally attached to a portion of the trailer frame, the second strut end pivotally attached to the suspension arm near the tire or wheel such that the weight of the trailer is transferred to the tire through the strut, the strut being compressible to compressably dampen and absorb sudden shocks and jars from momentary changes in the road surface such as pot holes and bumps before such shocks reach the trailer frame.

In one or more embodiments of the inventive disclosures made herein the means of rotably mounting the wheel to the trailer frame includes a strait axle mounted to the frame allowing the decrease in weight due to elimination of the suspension.

In one or more embodiments of the inventive disclosures made herein the articulating coupling member comprises the following elements. A receiving member is secured to a second end of the trailer tongue. A universal joint member is pivotally coupled at one end to the receiving member by a first pin, the pin received through aligned holes in the receiving member and the universal joint member. The universal joint member is pivotally coupled at its opposing end to the receiver hitch by a second pin. The receiver hitch as discussed above is secured to the motorcycle frame. The pins are at substantially right angles to each other and both pins are at right angles to the axis of elongation of the universal joint member.

In one or more embodiments of the inventive disclosures made herein the articulating coupling member comprises the following elements. A rotating ball hitch design with a horizontal pin connection that is substantially right angles to each other is mounted to the motorcycle trailer hitch, allowing the trailer tongue ears to be connected by use of the horizontal pin.

In one or more embodiments of the inventive disclosures made herein the frame comprises metallic tubular structural members including aluminum, steel, alloys of aluminum and alloys of steel.

It is an objective of the inventive disclosure made herein to provide a motorcycle or motorbike trailer which will lean with the cycle allowing the cycle and trailer to respond as a unit.

It is another objective of the inventive disclosure made herein to provide a motorcycle or motorbike trailer having a tire that will track behind the cycle tires thereby eliminating the sideways torque transmitted to the motorcycle or motorbike when the trailer hits debris, a pothole or a curb.

It is another objective of the inventive disclosure made herein to provide a motorcycle or motorbike trailer that can be built to be light in weight eliminating the feeling of under power while riding the motorcycle.

It is another objective of the inventive disclosure made herein to provide a trailer that is can be kept the same width as the widest part of the motorcycle thereby eliminating the problem of maneuvering through traffic with trailer hanging out past the side of the motorcycle.

It is another objective of the inventive disclosure made herein to provide a trailer that will perform on the road and in turns the same as the motorcycle and will not limit the motorcycle from performing the way it was intended.

These and other objects of the invention made herein will become readily apparent upon further review of the following specification and associated drawings.

BRIEF DESCRIPTION OF THE DRAWINGS

The drawings show a form of the invention that is presently preferred; however, the invention is not limited to the precise arrangement shown in the drawings.

DETAILED DESCRIPTION OF THE DRAWINGS

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein.

Figure 1:
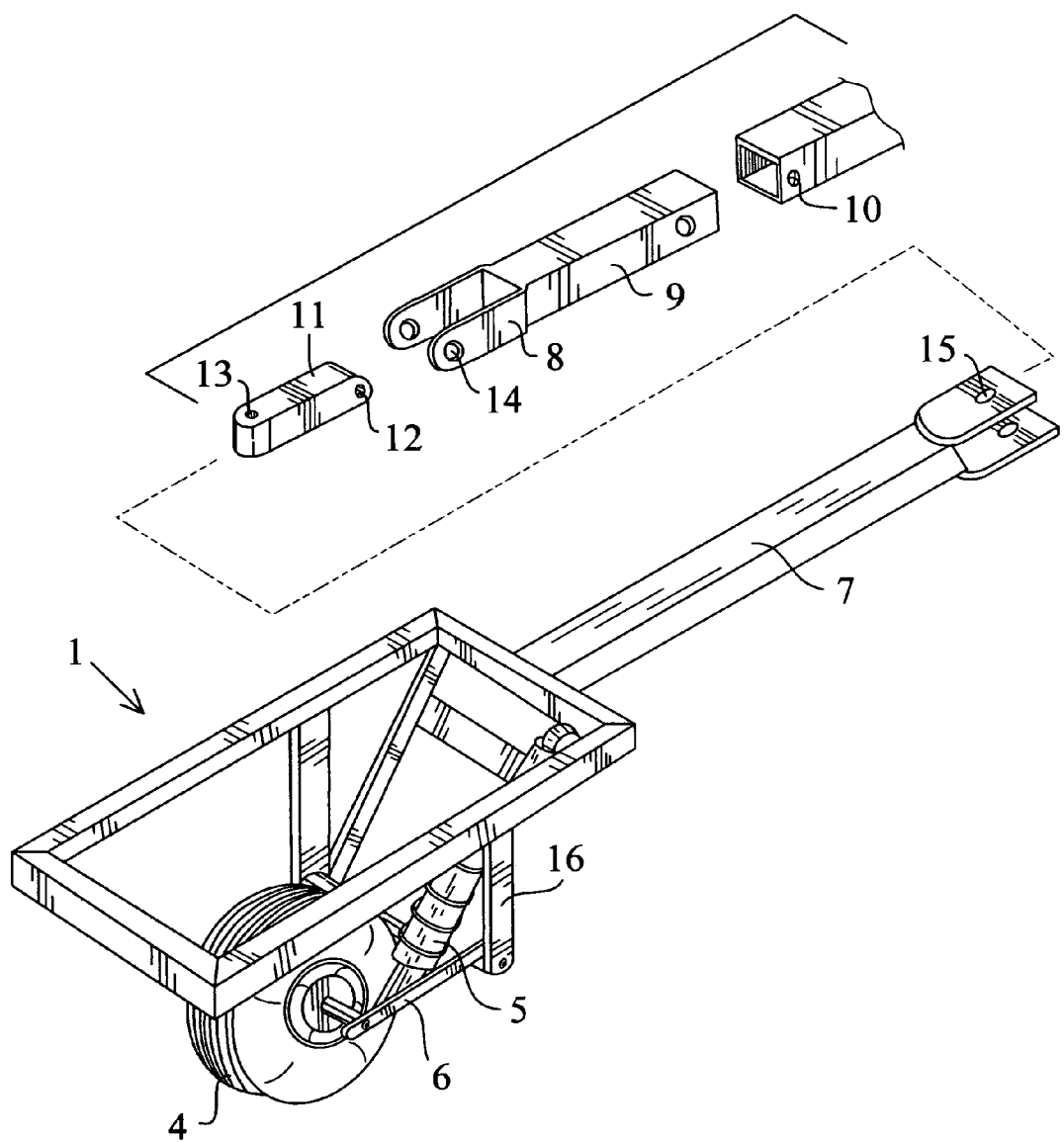
FIG. 1 depicts a perspective view of one preferred embodiment of a single wheeled trailer configured to be pulled behind a motorcycle or motorbike and to track and lean with the vehicle.

FIG. 1 depicts a perspective view of one preferred embodiment of a single wheeled trailer configured to be pulled behind a motorcycle or motorbike and to track and lean with the vehicle. The single wheel motorcycle trailer 1 has welded tubular steel frame 2 consisting of a set of tubular steel members welded end to end so as to form a rectangular substantially horizontal box frame. A suspension arm has a first end 3 pivotally mounted to a vertical support arm 16 of the trailer frame 2. An air filled tire or wheel 4 is positioned under a center portion of the frame 2. The wheel is rotably mounted proximate to the second end of the suspension arm, wherein the wheel is an air filled tire providing rolling support for the weight of the trailer and trailer load in traveling over ground. A shock absorbing strut 5 is attached at one end to the trailer frame 2 and attached at the opposing end of the strut to the suspension arm end 6. The strut 5 has a spring in parallel combination with a shock absorber, the spring for compressibly transferring weight from the trailer to the wheel 4. A trailer tongue 7 formed of tubular steel has one end rigidly secured to a front portion of the trailer frame 2. A universal joint receiver member 8 comprising a pair of spaced pivot ears is attached at one end of a tubular receiver hitch 9. The opposing end of the receiver hitch 9 is adapted to removably couple with a Reese hitch which is secured to the frame of the motorcycle. A first pin is received through the aligned holes 15 of the receiving member and the hole 13 of the universal joint such that the pin pivotally couples the receiving member to the universal joint. A second pin is received through the aligned pivot holes 14 of the receiver hitch and the hole 12 of the universal joint such that the pin pivotally couples the receiver hitch to the universal joint. The axis's of the pivot holes 12 and 13 of the universal joint are all at substantially right angles to each other, thereby allowing the trailer arm 7 to pivot in any direction relative to and about the receiver member 8.

Figure 2:
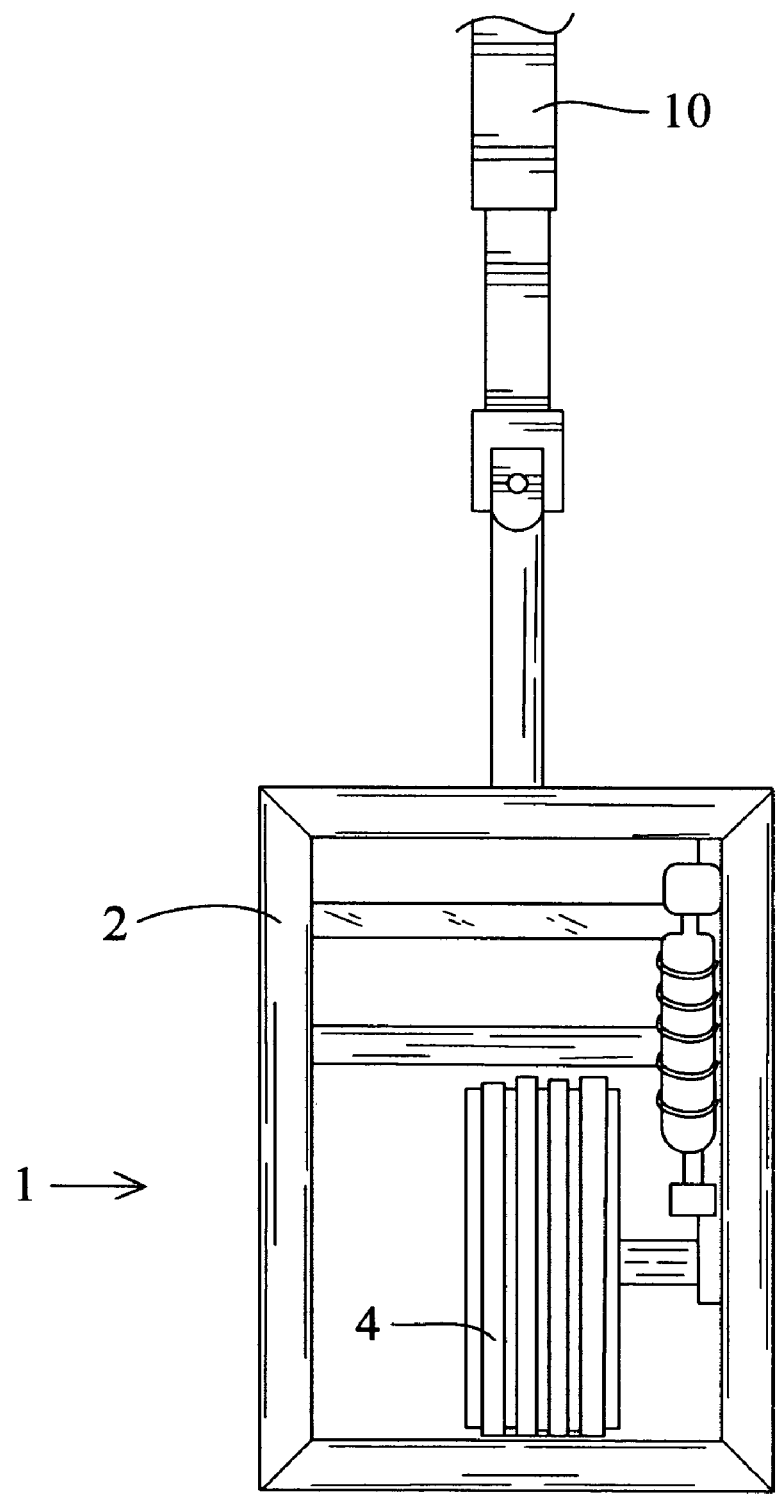
FIG. 2 depicts a top view of the single wheeled trailer of FIG. 1.

FIG. 2 depicts a top view of the single wheeled trailer of FIG. 1. The single wheel motorcycle trailer 1 has welded tubular steel frame 2 consisting of a set of tubular steel members welded end to end so as to form a rectangular substantially horizontal box frame. The wheel 4 is rotably mounted under the frame 2 in a central portion of the frame and in tracking alignment with the motorcycle tires (not shown, but aligned generally with the Reese hitch 10). As the wheel 4 is aligned to track behind the motorcycle wheels, the motorcycle does not experience a torque load from one wheel of the trailer hitting a pothole or curb as the line of trailer pulling force runs directly through the motorcycle wheels and not off to the side of the wheels.

Figure 3:
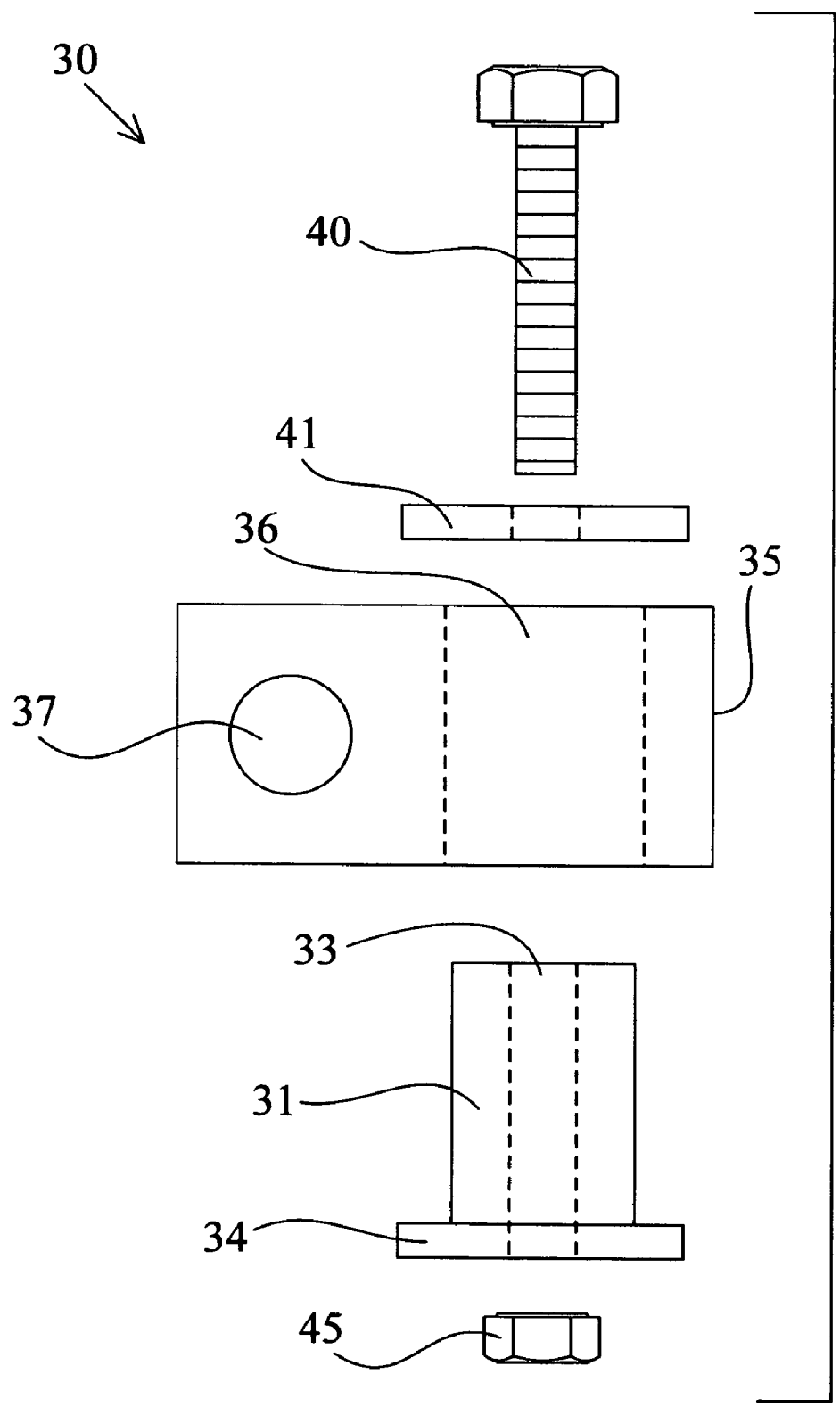
FIG. 3 depicts a top assembly view of an articulating coupling member for coupling the trailer tongue to the motorcycle trailer hitch in accordance with the inventive disclosures presented herein.
Figure 7:
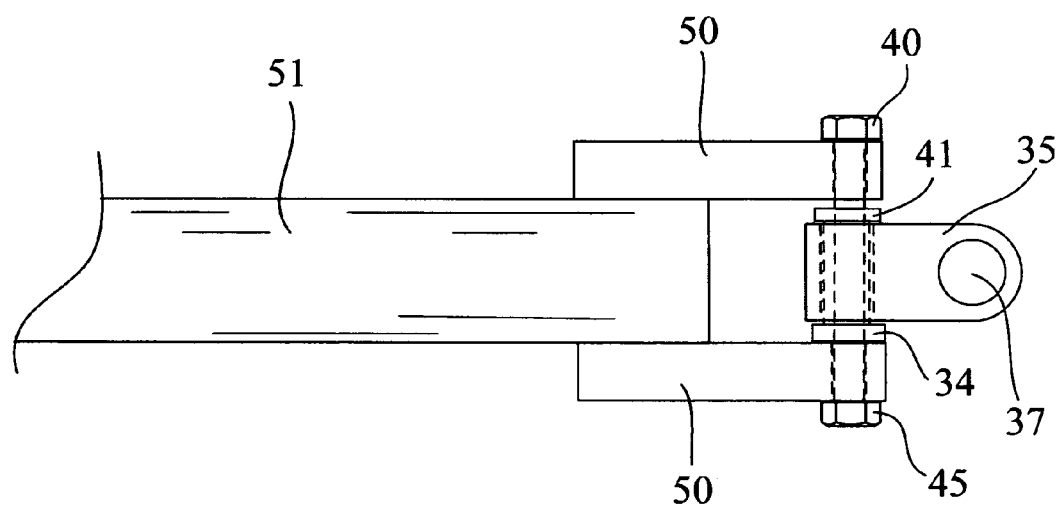
FIG. 7 depicts a top view of the trailer tongue of FIG. 5 having the articulating coupling member of FIG. 3 swively engaged to the trailer tongue.

Turning now to FIG. 3 and FIG. 7:

FIG. 3 depicts a top assembly view of an articulating coupling member for coupling the trailer tongue to the motorcycle trailer hitch in accordance with the inventive disclosures presented herein. FIG. 7 depicts a top view of a trailer tongue of having the articulating coupling member of FIG. 3 swively engaged to the trailer tongue. The articulating coupling member 30 has a cylindrical base plate 34 including a cylindrical load bearing portion 31 secured thereon. The load bearing portion base plate and load bearing portion has a bore 33 extending through a center portion thereof. The swivel member 35 has a first bore 36 sized to receive the load bearing portion 31 of the base plate therein. The swivel member 35 has a second bore 37 having an axis substantially perpendicular to the axis of the first bore 36. The second bore 37 sized to receive and swivel upon a coupling member (not shown) of the motorcycle trailer hitch. Elongated bolt or pin 40 extends through washer 41, then through the bore 33 of the base plate 30 and 31. If element 40 is a bolt, then the bolt threadably engages the nut 45. FIG. 7. depicts the articulating coupling member 30 swively engaged to the trailer tongue side plates 50 of the trailer hitch 51.

Figure 4:
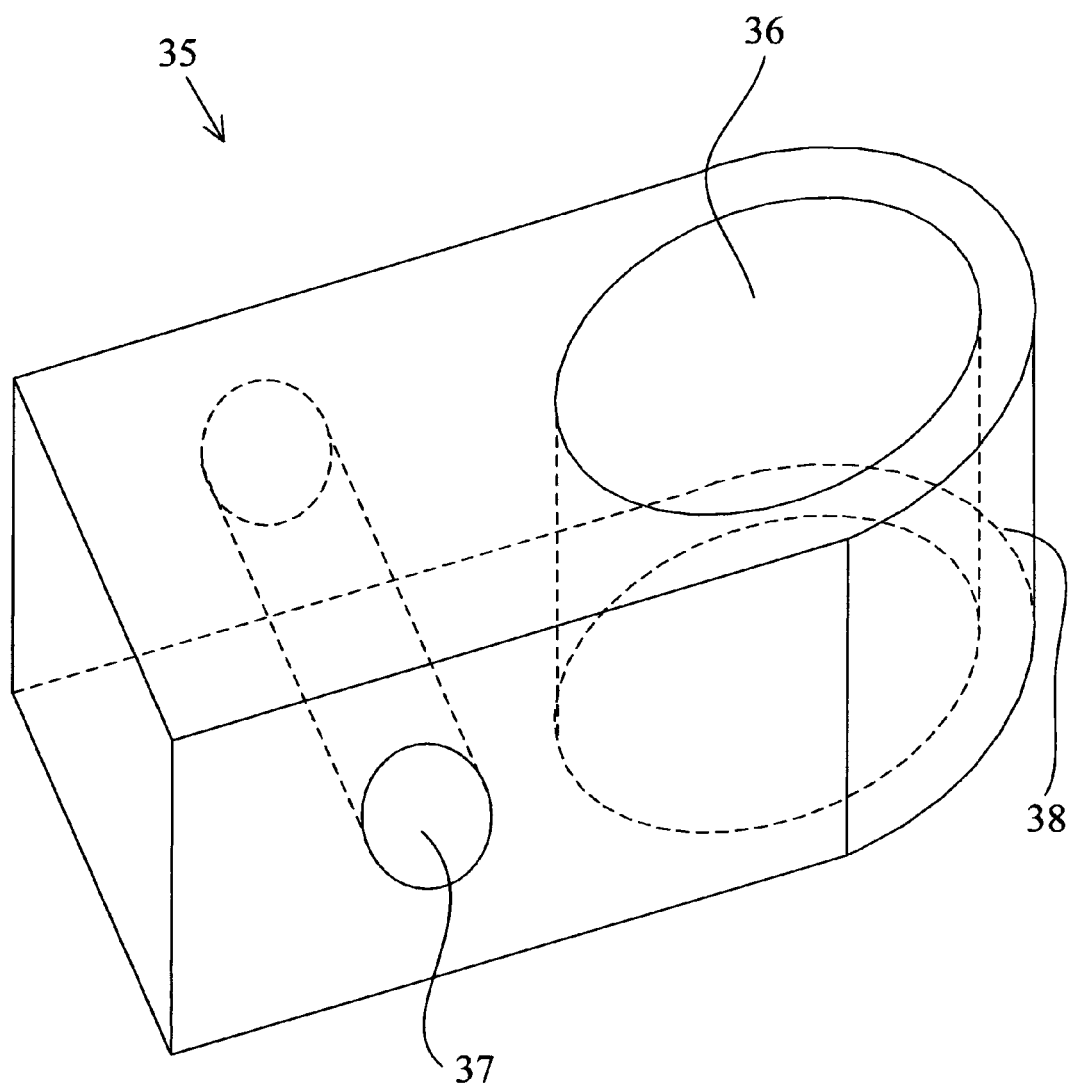
FIG. 4 depicts a perspective view of the swivel member of the articulating coupling member depicted in FIG. 3, in accordance with the inventive disclosures presented herein.

FIG. 4 depicts a perspective view of the swivel member of the articulating coupling member depicted in FIG. 3, in accordance with the inventive disclosures presented herein. Swivel member 35 has a first bore 36 and a second bore 37. The swivel member has a rounded face 38 facing towards the motorcycle's hitch, wherein first bore 36 is sized to be swively received on the motorcycle hitch.

Figure 5:
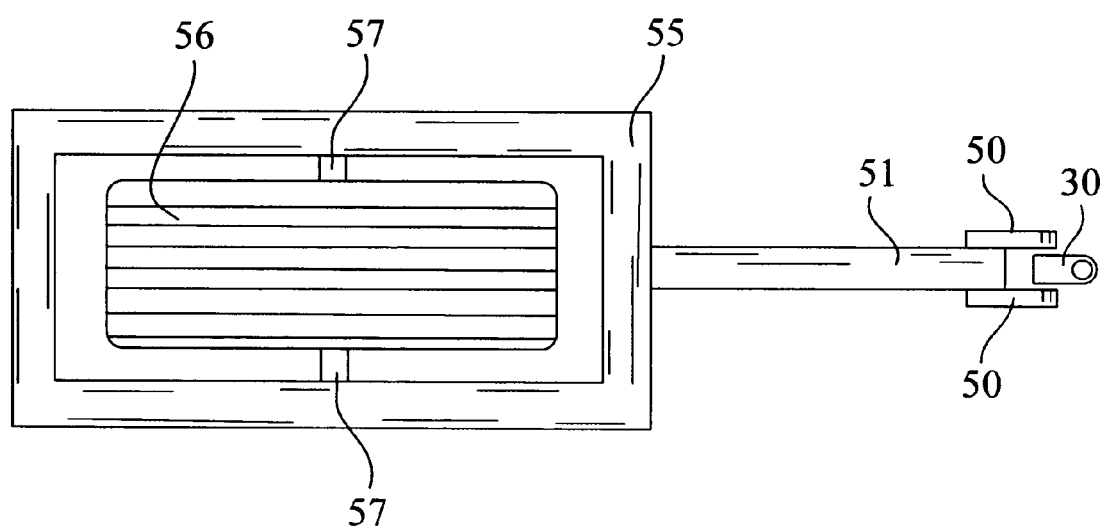
FIG. 5 depicts a top view of another embodiment of a single wheeled trailer having a trailer tongue adapted to use the articulating coupling member of FIG. 3.
Figure 6:
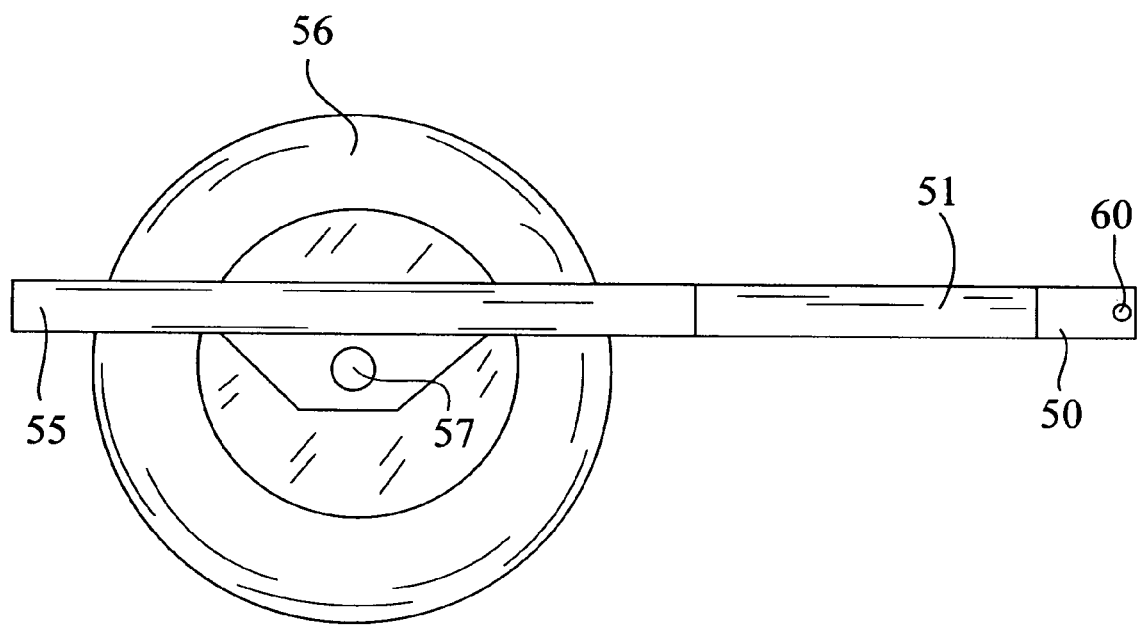
FIG. 6 depicts a side view of the single wheeled trailer of FIG. 5 having a trailer tongue adapted to use the articulating coupling member of FIG. 3.

Turing now to FIG. 5 and FIG. 6:

FIG. 5 depicts a top view of another embodiment of a single wheeled trailer having a trailer tongue adapted to use the articulating coupling member of FIG. 3. FIG. 6 depicts a side view of the single wheeled trailer of FIG. 5 having a trailer tongue adapted to use the articulating coupling member of FIG. 3. The trailer hitch of FIG. 5 and FIG. 6 is the trailer hitch depicted in a zoom view in FIG. 7. The trailer hitch 51 has the articulating coupling member 30 (shown in FIG. 5) swively engaged to the trailer tongue side plates 50. The trailer frame 55 has a wheel 56 having a straight axle 57 mounted to the frame 55 allowing a decrease in the weight of the trailer due to the elimination of other suspension components. FIG. 6 omits the articulating coupling member from the view for clarity so that the aligned holes 60 in the opposed trailer tongue side plates 50 are clearly visible. The aligned holes receive the pin or bolt (FIG. 3 element 40) therethrough to swively mount the articulating coupling member 30.

The discussed construction, illustrations and sequence of operation is for one embodiment of the invention, but is in no way limiting to other embodiments. The operating modes may be changed and enhanced without deviating from the intention of this inventive disclosure.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, and mechanical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A trailer configured to be pulled behind a two wheeled vehicle having wheels aligned in tandem and to track and lean with the vehicle, the trailer comprising:
    a trailer frame for supporting the weight of a load;
    a wheel positioned under a center portion of the frame;
    a means of rotably mounting the wheel to the frame, wherein the wheel provides rolling support for the trailer over ground, the means of rotably mounting the wheels comprising:
        a suspension arm having two opposing ends, a first suspension arm end pivotally mounted to the trailer frame, the wheel is rotably mounted proximate to the second end of the suspension arm; and
        a shock absorbing strut for resisting compression in the direction of its length, the strut having opposing first and second attachment ends, the first strut end pivotally attached to a portion of the trailer frame, the second strut end pivotally attached to the suspension arm proximate to the second end of the suspension arm.
    a trailer tongue having a first end rigidly secured to a front portion of the trailer Frame; and
    an articulating coupling member having two opposing ends, the first end of the articulating member secured to the second end of the tongue, the articulating coupling member comprising:
        a universal joint receiving member having a hole therethrough, the receiving member secured to a second end of the tongue;
        a universal joint member having two pivot holes therethrough, each position proximate opposing ends of the universal joint, the universal joint having an axis of elongation, each pivot hole having an axis, the axes of the pivot holes and universal joint are at substantially right angles to each other;
        a first pin received through the hole of the receiving member and the first hole of the universal joint, the pin pivotally coupling the receiving member to the universal joint;
        a receiver hitch having a pivot hole proximate a first end of the receiver hitch, a second end of the receiver hitch adapted for removably mounting to a hitch member secured at the rear of the motorcycle; and
        a second pin received through a pivot hole in the first end of the receiver hitch and the second hole of the universal joint, the pin pivotally coupling the receiver hitch to the universal joint.

2. The trailer for a two wheeled vehicle of claim 1, wherein the frame comprises metallic tubular structural members, the metals selected from the set consisting of steel, aluminum, alloys of steel, alloys of aluminum.

3. A single wheel trailer configured to be pulled behind a motorcycle and to track and lean with the motorcycle, the trailer comprising:
   a trailer frame comprising welded tubular steel structural members, a top surface of the trailer frame having a generally rectangular shape, the top of the frame configured for receiving a load thereon;
   a means of rotably mounting a wheel to the frame, wherein the wheel provides rolling support for the trailer over ground, wherein the wheel is positioned under a center portion of the frame, the means of rotably mounting the wheel to the frame comprising:
      a suspension arm having two opposing ends, a first suspension arm end pivotally mounted to the trailer frame;
      the wheel rotably mounted proximate to the second end of the suspension arm, wherein the wheel is an air filled tire providing rolling support for the trailer over ground; and
      a shock absorbing strut for resisting compression in the direction of its length, the strut having opposing first and second attachment ends, the first strut end pivotally attached to a portion of the trailer frame, the second strut end pivotally attached proximate the second end of the suspension arm, the strut having a spring in parallel combination with a shock absorbing for compressibly transferring weight from the trailer to the wheel;
   a trailer tongue having a first end rigidly secured to a front portion of the trailer frame; and
   an omni-directional swivel hitch means having a first end secured to a second end of the trailer tongue, a second end of the omni-directional swivel hitch means removably engageable with a motorcycle trailer hitch, wherein the omni-directional swivel hitch means permits the trailer tongue to swivel about the motorcycle trailer hitch, the omni-directional swivel hitch means comprising:
      a universal joint receiving member having a hole therethrough, the receiving member secured to a second end of the tongue;
      a universal joint member having two pivot holes therethrough, each position proximate opposing ends of the universal joint, the universal joint having an axis of elongation, each pivot hole having an axis, the axes of the pivot holes and universal joint are at substantially right angles to each other;
      a first pin received through the hole of the receiving member and the first hole of the universal joint, the pin pivotally coupling the receiving member to the universal joint;
      a receiver hitch having a pivot hole proximate a first end of the receiver hitch, a second end of the receiver hitch adapted for removably mounting to a hitch member secured at the rear of the motorcycle; and
      a second pin received through the pivot hole of the receiver hitch and the second hole of the universal joint, the pin pivotally coupling the receiver hitch to the universal joint.

4. A single wheel trailer configured to be pulled behind a motorcycle and to track and lean with the motorcycle, the trailer comprising:
   a trailer frame comprising welded tubular steel structural members, a top surface of the trailer frame having a generally rectangular shape, the top of the frame configured for receiving a load thereon;
   a means of rotably mounting a wheel to the frame, wherein the wheel provides rolling support for the trailer over ground, wherein the wheel is positioned under a center portion of the frame, the means of rotably mounting the wheel to the frame comprising:
      a straight axle directly secured to the frame, wherein the wheel mount does not utilize a suspension system; and
      the wheel rotably secured to the straight axle, wherein the weight and cost of the trailer is reduced;
   a trailer tongue having a first end rigidly secured to a front portion of the trailer frame; and
   an omni-directional swivel hitch means having a first end secured to a second end of the trailer tongue, a second end of the omni-directional swivel hitch means removably engageable with a motorcycle trailer hitch, wherein the omni-directional swivel hitch means permits the trailer tongue to swivel about the motorcycle trailer hitch, the omni-directional swivel hitch means comprising:
      a universal joint receiving member having a hole therethrough, the receiving member secured to a second end of the tongue;
      a universal joint member having two pivot holes therethrough, each position proximate opposing ends of the universal joint, the universal joint having an axis of elongation, each pivot hole having an axis, the axes of the pivot holes and universal joint are at substantially right angles to each other;
      a first pin received through the hole of the receiving member and the first hole of the universal joint, the pin pivotally coupling the receiving member to the universal joint;
      a receiver hitch having a pivot hole proximate a first end of the receiver hitch, a second end of the receiver hitch adapted for removably mounting to a hitch member secured at the rear of the motorcycle, and
      a second pin received through the pivot hole of the receiver hitch and the second hole of the universal joint, the pin pivotally coupling the receiver hitch to the universal joint.

5. A single wheel trailer configured to be pulled behind a motorcycle and to track and lean with the motorcycle, the trailer comprising:
   a trailer frame comprising welded tubular steel structural members, a top surface of the trailer frame having a generally rectangular shape, the top of the frame configured for receiving a load thereon;
   a means of rotably mounting a wheel to the frame, wherein the wheel provides rolling support for the trailer over ground, wherein the wheel is positioned under a center portion of the frame, the means of rotably mounting the wheel to the frame comprising:
      a suspension arm having two opposing ends, a first suspension arm end pivotally mounted to the trailer frame;
      the wheel rotably mounted proximate to the second end of the suspension arm, wherein the wheel is an air filled tire providing rolling support for the trailer over ground; and
      a shock absorbing strut for resisting compression in the direction of its length, the strut having opposing first and second attachment ends, the first strut end pivotally attached to a portion of the trailer frame, the second strut end pivotally attached proximate the second end of the suspension arm, the strut having a spring in parallel combination with a shock absorbing for compressibly transferring weight from the trailer to the wheel;

a trailer tongue having a first end rigidly secured to a front portion of the trailer frame, the trailer tongue further comprising:
  a pair of distally parallel spaced trailer tongue side plates, each plate having a bore therethrough, the side plates secured to opposing side faces of the second end of the trailer tongue; and
an omni-directional swivel hitch means having a first end secured to a second end of the trailer tongue, a second end of the omni-directional swivel hitch means removably engageable with a motorcycle trailer hitch, wherein the omni-directional swivel hitch means permits the trailer tongue to swivel about the motorcycle trailer hitch, the omni-directional swivel hitch means comprising an articulating coupling member for coupling the trailer tongue to the motorcycle trailer hitch, the articulating coupling member comprising:
  a cylindrical base plate having an elongated cylindrical load bearing portion secured thereon, the base plate and load bearing portion having a bore extending through a center portion thereof;
  a swivel member having a first cylindrical bore sized to receive the load bearing portion of the base plate therein, the second cylindrical bore having an axis substantially perpendicular to the axis of the first cylindrical bore, the second cylindrical bore sized and configured to receive upon and swivel upon a coupling member of the motorcycle trailer hitch, wherein the swivel member is free to pivot about a first axis; and
  an elongated pin received through the bore of the first side plate, the pin extending through a washer, then through the cylindrical first bore of the cylindrical base plate, then extending through the bore of the second side plate, wherein the swivel means is free to pivot about a second axis, wherein the first and second axis are substantially perpendicular, wherein the trailer tongue is swively connected to the motorcycle trailer hitch.

6. A single wheel trailer configured to be pulled behind a motorcycle and to track and lean with the motorcycle, the trailer comprising:
  a trailer frame comprising welded tubular steel structural members, a top surface of the trailer frame having a generally rectangular shape, the top of the frame configured for receiving a load thereon;
  a means of rotably mounting a wheel to the frame, wherein the wheel provides rolling support for the trailer over ground, wherein the wheel is positioned under a center portion of the frame, the means of rotably mounting the wheel to the frame comprising:
    a straight axle directly secured to the frame, wherein the wheel mount does not utilize a suspension system; and
    the wheel rotably secured to the straight axle, wherein the weight and cost of the trailer is reduced;
  a trailer tongue having a first end rigidly secured to a front portion of the trailer frame, the trailer tongue further comprising:
    a pair of distally parallel spaced trailer tongue side plates, each plate having a bore therethrough, the side plates secured to opposing side faces of the second end of the trailer tongue; and
  an omni-directional swivel hitch means having a first end secured to a second end of the trailer tongue, a second end of the omni-directional swivel hitch means removably engageable with a motorcycle trailer hitch, wherein the omni-directional swivel hitch means permits the trailer tongue to swivel about the motorcycle trailer hitch, the omni-directional swivel hitch means comprising an articulating coupling member for coupling the trailer tongue to the motorcycle trailer hitch, the articulating coupling member comprising:
    a cylindrical base plate having an elongated cylindrical load bearing portion secured thereon, the base plate and load bearing portion having a bore extending through a center portion thereof;
    a swivel member having a first cylindrical bore sized to receive the load bearing portion of the base plate therein, the second cylindrical bore having an axis substantially perpendicular to the axis of the first cylindrical bore, the second cylindrical bore sized and configured, to receive upon and swivel upon a coupling member of the motorcycle trailer hitch, wherein the swivel member is free to pivot about a first axis; and
    an elongated pin received through the bore of the first side plate, the pin extending through a washer, then through the cylindrical first bore of the cylindrical base plate, then extending through the bore of the second side plate, wherein the swivel means is free to pivot about a second axis, wherein the first and second axis are substantially perpendicular, wherein the trailer tongue is swively connected to the motorcycle trailer hitch.

* * * * *